US005916662A

United States Patent [19]

Schmidt

[11] Patent Number: 5,916,662

[45] Date of Patent: Jun. 29, 1999

[54] DECORATIVE TILE AND DECORATIVE PRINTING THEREOF

[76] Inventor: Mark Joseph Schmidt, 2415 Maryland Ave., Cincinnati, Ohio 45204

[21] Appl. No.: 08/814,752

[22] Filed: Mar. 7, 1997

[51] Int. Cl.[6] .......... B32B 3/30

[52] U.S. Cl. .......... 428/141; 428/152; 428/158; 428/159; 428/160; 428/173; 428/200; 428/204; 428/203; 428/201

[58] Field of Search .......... 428/141, 152, 428/158, 159, 160, 173, 200, 204, 203, 201

[56] References Cited

U.S. PATENT DOCUMENTS

| | | | |
|---|---|---|---|
| 1,606,169 | 11/1926 | Mayer | 428/173 |
| 2,032,405 | 3/1936 | Fischer et al. | 428/173 |
| 2,307,734 | 1/1943 | De Vault | 428/173 |
| 2,587,594 | 3/1952 | Chavannes et al. | 428/173 |
| 4,225,374 | 9/1980 | Kaufmann | 156/200 |
| 4,312,686 | 1/1982 | Smith et al. | 156/209 |
| 4,614,680 | 9/1986 | Fry et al. | 428/158 |
| 4,678,528 | 7/1987 | Smith et al. | 156/200 |
| 4,689,259 | 8/1987 | Miller, Jr. et al. | 428/142 |
| 5,122,212 | 6/1992 | Ferguson et al. | 156/209 |
| 5,670,237 | 9/1997 | Shultz et al. | 428/173 |

*Primary Examiner*—William P. Watkins, III
*Attorney, Agent, or Firm*—Wood, Herron & Evans, L.L.P.

[57] ABSTRACT

A decorative tile is made of molded hard urethane foam, having a surface patterned with smooth areas interrupted by surface textures, and colored by a coloring agent which is concentrated within the surface textures and thinly covers the smooth areas, so as to produce the convincing appearance of a weathered, aged stone tile. The surface of this tile (and other conventional tiles) is decorated in an automated fashion, by printing a clear sheeting with an electrostatic ink in a color laser printer, and then compressing the sheeting against the tile surface in a high temperature press to heat transfer the sheeting to the surface of the tile. This resulting product is a durable, light weight tile having a protected printed surface, indistinguishable from hand painted stone.

38 Claims, 2 Drawing Sheets

DECORATIVE TILE AND DECORATIVE PRINTING THEREOF

FIELD OF THE INVENTION

The present invention relates to decorative tiles and methods for decorative printing of such tiles.

BACKGROUND OF THE INVENTION

For hundreds of years, ceramic and stone tiles have been used for decorative purposes on buildings, artwork and furniture, among other applications. Tiles of stone in particular have been used since the beginning of recorded history as elegant building decorations. In modern time, ceramic tiles, which are typically painted with glaze and fired in a kiln, have been frequently used on surfaces where resistance to water and abrasion is needed, such as in bathrooms and exterior surfaces. However, in more elegant applications, tiles of solid stone such as marble are still used, due to the unique texture and visual appearance of solid stone, as well as the desire to evoke the appearance of an ancient structure.

Ceramic or stone tiles are often left bare, but in many applications it is desirable to decorate the ceramic or stone tiles with artwork.

Both ceramic and stone tile have disadvantages when used as a building material. Firstly, ceramic and stone tiles are heavy and therefore difficult to maneuver and hold in position. As a result, tiles are typically glued into position on walls to ensure the tiles do not fall off. This means the tiles cannot be easily replaced or exchanged. Furthermore, ceramic and stone tiles are brittle and prone to breakage, particularly during changing weather conditions. Finally, ceramic and stone tiles are relatively difficult and expensive to decorate with an image. One method of decoration is to hand paint the tiles, but this requires extensive effort by an artist. Furthermore, it is difficult to accurately reproduce an original image by this method. Moreover, a hand-painted surface is typically fragile and subject to chipping. Although a hand-painted ceramic tile can be made durable by incorporating the painting into the tile glaze, this approach requires custom painting of the tile prior to kiln firing, thus increasing the cost.

Accordingly, there is a need in the art for a decorative tile which avoids the various drawbacks of known ceramic and stone tiles described above. Furthermore, there is a need for a method of forming decorative artwork on tiles in a manner which is more durable and accurate, and less labor-intensive than hand painting.

SUMMARY OF THE INVENTION

In accordance with principles of the present invention, the above objects are achieved by a unique decorative tile comprising a substrate of hard molded foam, having a surface with smooth areas interrupted by surface textures that simulates a stone (e.g., marble) tile. The decorative tile is colored by a coloring agent which is concentrated within the surface textures and thinly covers the smooth areas, so as to produce the convincing appearance of a weathered, aged stone tile. The foam tile, however, is substantially lighter than stone so that, for example, the tile may be mounted to a wall with a removable fastener, such as a fastener of the hook-and-loop type. Furthermore, the foam tile is substantially less brittle than stone.

In specific embodiments, the tile is formed of urethane foam, which is expanded within a mold into the shape of the tile. The urethane tile may be made flat, or may be curved as needed to fit a building space, by applying heat to the urethane while clamping the tile to a curved surface. To produce a realistic stone appearance, the urethane tile is coated with a light color, protective high-temperature paint, and then dipped into dark color acrylic paint which provides the coloring agent.

In a second aspect, the invention features the novel process for manufacturing this decorative tile. A suitable mold is formed from a master (such as a textured stone slab) by immersing the master in a molding compound to cover at least the surface of master which is to be replicated, curing the molding compound, and then removing the master to leave a molding recess replicating the smooth areas and surface textures of the master. Uncured urethane foam is then placed in the molding recess and allowed to expand to the boundaries of the mold and cure, causing the urethane foam to replicate the smooth areas and surface textures of the master. Once the urethane foam has cured, the completed decorative urethane tile can be removed from the mold and placed into use.

In specific embodiments, the mold is coated with a light color high temperature paint prior to filling the molding recess with urethane foam, so that the urethane foam tile emerges from the mold enveloped with a barrier coating. This barrier coating facilitates the subsequent coloring of the tile by (as discussed above) dipping the tile in a bath of dark acrylic paint or another coloring agent.

Substantially one-half to three-quarter pound of urethane foam is placed into the mold, to form a tile having a total volume of about one twentieth of a square foot. The resulting cured urethane foam, which has a density of eight to eleven pounds, is structurally strong while remaining substantially lighter than an equivalent volume of stone or ceramic tile.

In a third aspect, the invention features a method of decoratively printing the surface of tiles such as the urethane tile described above, or alternatively known stone or ceramic tiles, in a manner which is substantially less labor intensive than hand painting. In this method, a clear sheeting is printed with an electrostatic ink (a step which may be performed by a monochromatic or multi-color laser printer). The sheeting is then compressed against the tile surface in a high temperature press to heat transfer the sheeting to the surface of the tile. This method produces a durable, protected printed surface, indistinguishable from hand painting. Furthermore, effective heat transfer of the sheeting can be achieved regardless of the presence of cracks, dimples or other surface textures on the surface of the tile. Moreover, because a electrostatic printing process is used to produce the image, the images can be easily and accurately mass-produced, or customized to a particular application.

In specific embodiments, the edges of the sheeting are abraded to mask their boundary with the tile surface, and then the printed tile is dipped in the above-noted coloring agent such as dark acrylic paint, so that the coloring agent concentrates within the surface textures of the tile and thinly covers the smooth areas of the tile, while also masking the boundaries of the clear sheeting, providing an attractive, hand-painted, aged appearance.

The above and other aspects, objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
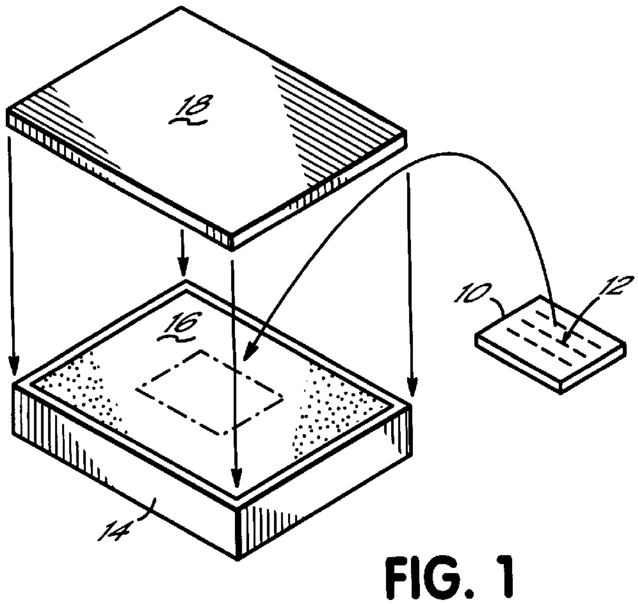
FIG. 1 is a perspective illustration of the formation of a mold from a slab of marble serving as a master.

Referring now to FIG. 1, to produce a mold for molding urethane tiles in accordance with the present invention, a master is selected, such as a twelve inch square, by five-eighths deep slab of tumbled Bottocino marble 10. The selected master 10 should have attractive texturing on its surface 12, because this surface will ultimately be reproduced on the urethane tiles.

To form an impression of the master 10, a basin 14 is filled with uncured silicon casting rubber 16. Basin 14 may be made, for example, of plywood sheeting nailed or screwed together into a rectangular box, and should be larger in every dimension than the master 10. While a single-mold basin is illustrated in FIG. 1, it will be appreciated that a larger basin could be used to form two or more impressions of two or more masters. A suitable silicon casting rubber is available from CastCraft of Box 17000, Memphis, Tenn., 38187. Hydrocal casting plaster has also been found effective for casting surface textures and molding tiles.

When basin 14 is suitably filled with silicon casting rubber, master 10 is inverted and placed into basin 14, such that the surface 12 to be cast is facing downward toward the bottom of basin 14. Then, a cover 18 (which also may be made of plywood) is clamped (e.g., with C-clamps) over the top of basin 14, forming an enclosed mold. Basin 14 and cover 18 clamped thereto, are then inverted, such that master 10 rests against cover 18, and is surrounded by the silicon casting rubber 16 which is trapped within the basin 14 by cover 18. (Silicon casting rubber 16 is sufficiently viscous to inhibit the rubber from seeping out of basin 14 during the curing process.)

Figure 2:
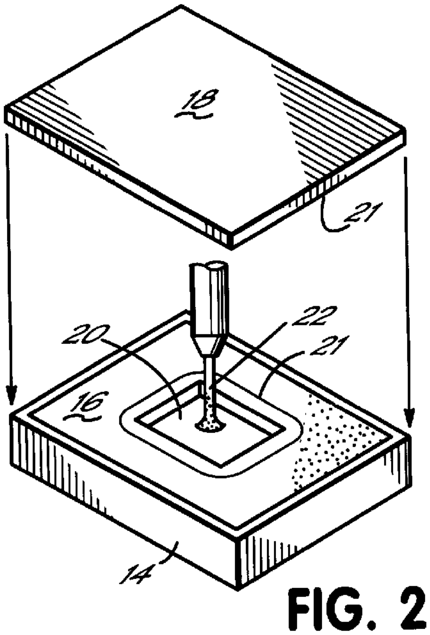
FIG. 2 illustrates the step of filling the mold with uncured urethane foam.

Basin 14 and cover 18 are then left clamped together in an inverted position for a sufficient time for silicon casting rubber 16 to cure. After the rubber has cured, the clamps holding basin 14 to cover 18, are removed, and cover 18 is removed. Master 10 is then removed, leaving a molding recess in the cured silicon casting rubber having a complete impression of the surface and four sides of the marble master 10. Referring to FIG. 2, this molding recess 20 in the cured silicon casting rubber can be clearly seen.

After thus creating a suitable mold, urethane foam tiles are cast using this mold. As a initial step, the entire interior surface of molding recess 20, and the opposing surface of cover 18, is sprayed with a light colored high temperature paint (identified at 21 in FIG. 2). A suitable high temperature paint is sold as the Colorworks Spray paint HT-1300 Hi-Temp White by Krylon Company of Solon, Ohio, 44139. The wet paint surface forms a barrier coating increasing the heat resistance of the urethane tile, and also providing the tile with a white surface suitable for printing and coloration, as well as acting as a mold release agent.

As seen in FIG. 2, while the barrier layer 21 of high temperature white paint is still wet, uncured liquid urethane foam 22 is delivered into the molding recess 20. Suitable urethane foams are sold under the trade name "VALTAFOAM". As an alternative, tiles might be molded from a sealing foam such as that sold under the trademark "GREAT STUFF" from InstaFoam Products, Inc., 2050 N. Broadway, Joliet, Ill., which is a mixture of polymeric diisocyanate, polyol resin and hydrocarbon gas. Approximately five to six fluid ounces of liquid urethane, totaling one-half to three-fourths of a pound of foam, are placed into molding recess 20. Then, before the liquid urethane foam has substantially expanded, cover 18 is positioned over basin 14 and again clamped in place. As a result, the expanding urethane foam 22 fills molding recess 20 and conforms to the interior dimensions of molding recess 20, conforming to the surface textures captured by the molding recess 20 from the master 10. (The surface tension of the expanding urethane foam 22 is such that the expanding foam does not substantially seep out from between basin 14 and cover 18 if these elements are securely clamped together.) Cover 18 is left clamped over basin 14 a sufficient time for the urethane foam to cease expansion and cure, which may take from a few minutes to a few hours (typically 10 minutes) as determined by the formulation of the foam.

Figure 3:
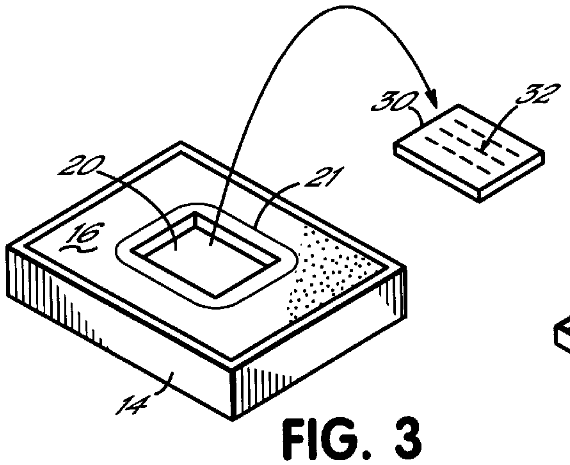
FIG. 3 illustrates the removal of a cured urethane tile from the mold.

Referring now to FIG. 3, after the foam is cured, cover 18 is removed from basin 14 and the cured foam tile 30, which is covered with white high temperature paint, is removed from the mold. The urethane foam which forms the substrate of the tile has a density of approximately 8–11 pounds, such that a twelve inch by twelve inch tile with a thickness of five-eighths of an inch weighs only between one-half and three-quarters of a pound.

As seen in FIG. 2, as a consequence of the molding process, surface 32 of the tile 30 has a surface patterned with smooth and textured areas identically to the original master 10, thus accurately replicating the surface appearance of a Bottocino marble tile.

Figure 4:
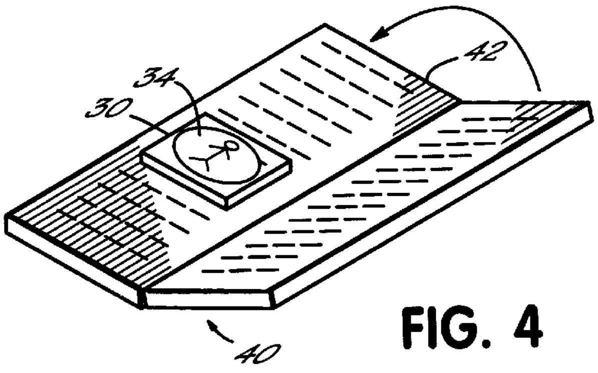
FIG. 4 illustrates the step of pressing a printed image onto the surface of a tile using a high temperature press.

Referring now to FIG. 4, the method for printing a tile with a color image will be disclosed. This method may be used in printing urethane tiles such as those formed by the preceding process, or ceramic or marble tiles, as desired.

In a first step, original artwork to be replicated is prepared for imaging onto the tile. This step may involve hand drawing a color illustration for the tile, printing a color illustration using a color laser printer, or locating a color artwork from another source. Then, the color artwork is printed on heat transfer paper in electrostatic ink (a type of fused glass toner) using a color copier.

Transfer paper was developed for printing images on fabrics such as T-shirts. The paper includes a paper substrate, which supports a clear plastic sheet that can be printed with electrostatic ink, e.g., by passing the transfer paper through a color copier. (Another suitable kind of transfer paper is sublimation wax transfer "sub wax" paper.) The printed clear plastic sheet can then be transferred from the paper substrate to fabric by a hot press. Suitable sheets of heat transfer paper are available under the trademark "GRAY LINE" from Conde of 7851 Shillinger Park West, Mobile, Ala., 36608-9697. A suitable electrostatic color copier is the model 5790 copier sold by Xerox Corporation of Rochester, N.Y. The model 5790 has a relatively low "flash point" and thus is less likely to overheat and jam the transfer paper.

If the image to be reproduced is smaller than the sheet of transfer paper, the excess transfer paper is cropped from the image to minimize the transfer surface applied to the tile.

The model 5790 printer has a maximum paper size of eleven by seventeen inches. Accordingly, where it is desired to form an image on the entire twelve-by-twelve surface of the tile, it is necessary to make two copies of the original image, displaced in position. The resulting two pieces of transfer paper are cut by hand, joined at the location of the cuts, and taped together with heat proof (e.g., cloth) tape. The result is a twelve-by-twelve heat transfer sheet containing the entire original image, ready to be applied to a tile surface.

Often, the above procedure must be used when a large image is to be created by spreading the image across multiple tiles. In this case, it is necessary to completely cover the surface of the tiles with appropriately selected portions of the image. Selected portions can be formed from a large original, or by using the enlargement function of the model 5790 copier.

It will be appreciated that the step of forming multiple displaced exposures of the image and joining the exposures is only necessary where the image to be reproduced exceeds eleven by seventeen inches in dimension. Furthermore, it will be appreciated that a color copier capable of handling a larger copy size could alleviate the need for assembling an image from multiple parts.

As seen in FIG. 4, once a sheet (or two joined sheets) of transfer paper has been printed with the desired image, the paper 34 is placed atop the tile 30, with the surface of the transfer paper bearing the image facing the surface of the tile to which the image is to be transferred. Tile 30 and transfer paper 34 bearing the image are then placed in a high temperature press 40, such as a model 220 heat seal machine available from Insta, 13925 E. 166$^{th}$ Street, Cerritos, Calif.

To print ceramic or stone tiles, the heated platen 42 of the press is adjusted to a temperature of approximately 375 degrees. The press is closed and clamped over tile 30 and transfer paper 34 and left in this closed position for approximately twenty-five seconds. Approximately forty pounds of pressure are applied to the handles of the press to bring it to closure. When the press is opened, the paper substrate can be removed, leaving the clear plastic sheet of the transfer paper 34 bonded to the surface of the tile 30. (It will be appreciated that the image transferred onto the tile is a mirror image of that printed initially on the transfer paper.)

Ceramic and stone tiles are relatively heat-resistant, and will not be warped or deformed by the heat and pressure of the press 40. However, urethane tiles manufactured in accordance with principles of the present invention have a break down temperature of about 400 degrees. Accordingly, to print urethane tiles, additional steps are required. First, the heated platen 42 of the press is adjusted to a temperature of 250 degrees. Next, prior to positioning the transfer paper on the tile, the tile is preheated in the press, on both sides, for approximately ten seconds. The transfer paper 34 is then placed onto the tile 30, and the tile and paper are clamped into the press as shown in FIG. 4 for ten to fifteen seconds to transfer the clear plastic sheeting bearing the printed image from the paper substrate and onto the tile surface. (Here again, the resulting image on the tile is a mirror image of that printed onto the transfer paper.)

Figure 5:
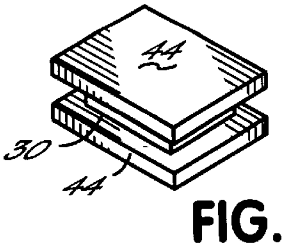
FIG. 5 illustrates a clamping step for shaping a urethane tile after removal from the high temperature press.

Referring now to FIG. 5, following the printing step, a urethane tile 30 is clamped during cooling to appropriately shape the tile. Specifically, to prevent the tile from bowing while it cools, the urethane tile 30 is clamped between two flat plates 44 (e.g., plywood sheets) as seen in FIG. 5, for one to two minutes as the tile cools. A curved tile can also be formed by clamping the tile between curved plates for one to two minutes, forcing the softened, hot urethane tile to conform to the curved surfaces of the plates.

The result of this transfer printing process, is a ceramic, stone or urethane tile having a printed image heat fused to its surface, and covered with a clear plastic coating transferred from the transfer paper. Both the tile and the printing on the tile are therefore waterproof and durable. The image may only be removed by sanding or chemical stripping.

Figure 6:
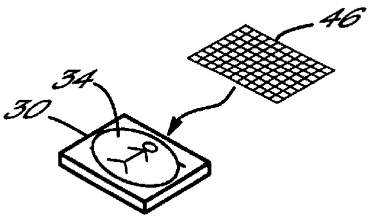
FIG. 6 illustrates the abrasion of the periphery of the clear sheeting after it has been heat-transferred onto the surface of the tile.

The boundary of the plastic sheeting transferred to the tile can be visible in some circumstances. Accordingly, as illustrated in FIG. 6, after the image is transferred to the tile, the edges of the transferred image are sanded with medium grit drywall screen paper 46 to remove any visible boundaries between the transferred plastic sheeting and the surface of the tile. Drywall screen paper 46 is effective for this purpose because it will less easily foul with plastic and/or tile surface dust generated by the sanding process. The boundary of the plastic sheeting is sanded only as needed to mask the boundary between the transferred sheeting and the bare tile surface.

Figure 7:
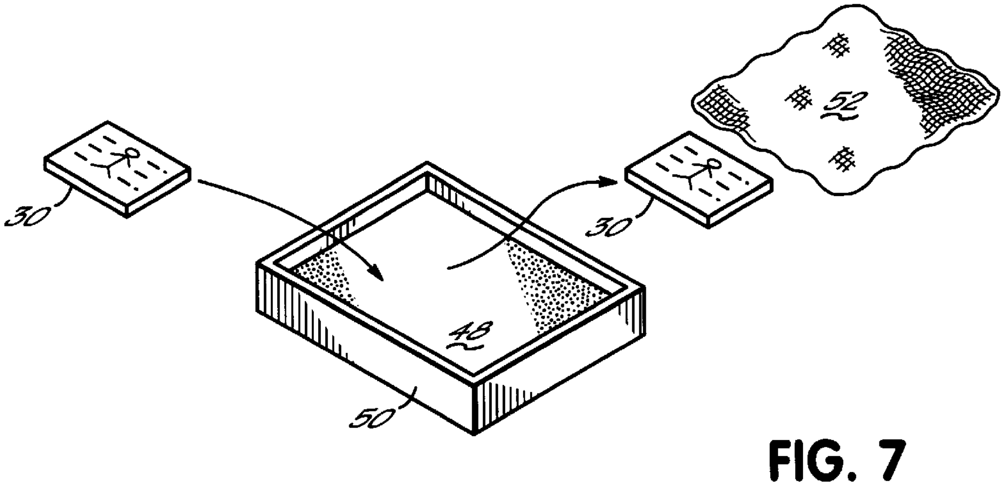
FIG. 7 illustrates the step of dipping the tile into a bath of acrylic paint coloring agent, and subsequent removal of excess coloring from the smooth surfaces of the tile.

Referring now to FIG. 7, after sanding, the tile 30 is immersed in a coloring agent wash 48 in a basin 50 to complete production. The wash 48 is formulated from a dark color flat latex (acrylic) paint, such as raw umber color latex paint, diluted with water to a 5-1 ratio. The tile is submerged in the wash and left to lie flat at the bottom of basin 50 (with the printed surface facing upward) for several minutes. This allows the coloring agent to penetrate the surface textures of the tile, producing an aged appearance. After this period of time, tile 30 is removed from wash 48, and the wash is patted off by hand using a terry cloth towel 52, leaving the coloring agent in the surface textures of the tile as well as a thin coating on the surface of the tile, producing a convincing aged appearance.

The finished result is a tile having an ancient, aged, hand-painted appearance. The urethane tiles described above are indistinguishable except by touch from tumbled, aged, Bottocino marble tile. The urethane foam dries with an external sealing skin, and therefore is substantially impervious to water. The printing is sealed on the surface of the tile by a clear plastic sheeting, and thus is also substantially waterproof and durable. Printed urethane tiles left outdoors through several seasons have shown no sign of degradation, other than minor fading in color due to exposure to sunlight. A Xenon light test demonstrated the electrostatic printing inks to be stable under 5–7 years of exposure to ultraviolet rays from sunlight.

When installed on a wall or ceiling, the tiles have the appearance of an ancient fresco wall, and when suitably printed with ancient artwork or floral patterns, are indistinguishable except by touch from authentic ancient tiles. At the same time, the tiles are extremely light and straightforward to manipulate, and may be installed by one person working alone. Tiles may be glued to wall surfaces, or alternatively fastened with hook-and-loop fasteners of the kind sold under the trademark "VELCRO". Hook and loop fasteners permit straightforward removal and replacement of the tiles, for cleaning, updating of images, or for seasonal rotation.

Figure 8:
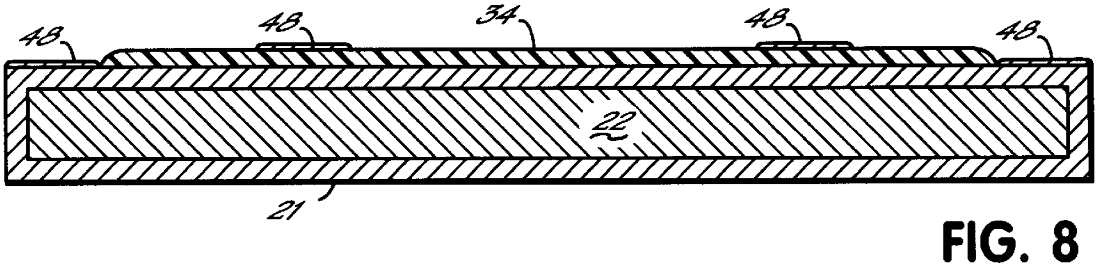
FIG. 8 is a cross-sectional view of a decorative urethane tile manufactured in accordance with principles of the present invention.

Referring now to FIG. 8, the cross section of a tile manufactured in accordance with the present invention can be reviewed. The substrate of the tile is a urethane foam 22, molded as noted above in a mold to have the surface textures of Bottocino marble or another suitable master. The exterior of substrate foam 22 is coated with a protective coating 21 of high temperature paint, protecting the exterior and providing a white color appropriate for printing. Atop one surface of the tile is a clear plastic sheeting 34 encapsulating electrostatic inks which has been heat transferred onto the tile. The edges of sheeting 34 are sanded down as noted above to eliminate visible boundaries with the tile. Finally, there is an uneven coating of dark color flat latex (acrylic) paint 48, concentrated in surface textures of the tile and thinly coated elsewhere, providing an aged appearance to the tile surface.

A ceramic or stone tile that has been printed in accordance with the present invention includes the plastic sheeting 34 and overlying acrylic paint 48 shown in FIG. 8, over a stone or glazed (or unglazed) ceramic substrate.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A decorative tile, comprising a polymer substrate having first and second substantially parallel main surfaces, the first main surface having smooth areas interrupted with surface textures, a barrier coating substantially surrounding said substrate, a coloring agent unevenly coating said substrate, said coloring agent being concentrated within said surface textures of said first main surface, and thinly covering said smooth areas of said first main surface.

2. The decorative tile of claim 1 wherein said coloring agent is a water soluble coloring agent.

3. The decorative tile of claim 1 wherein said barrier coating substantially surrounds said substrate beneath said coloring agent.

4. The decorative tile of claim 3 wherein said barrier coating is a high temperature paint.

5. The decorative tile of claim 4 further comprising a clear sheeting printed with ink, on said first main surface of said substrate.

6. The decorative tile of claim 1 further comprising a clear sheeting printed with ink, on said first main surface of said substrate.

7. The decorative tile of claim 6 wherein said clear sheeting is beneath said coloring agent.

8. The decorative tile of claim 1 wherein said first and second main surfaces are curved.

9. The decorative tile of claim 1 wherein said polymer substrate comprises a hard urethane polymer.

10. The decorative tile of claim 9 wherein said hard urethane polymer substrate comprises a foam.

11. The decorative tile of claim 2 wherein said water soluble coloring agent is an acrylic paint.

12. The decorative tile of claim 2 wherein said water soluble coloring agent is a latex paint.

13. The decorative tile of claim 5 wherein said clear sheeting is printed with electrostatic ink.

14. The decorative tile of claim 5 wherein said clear sheeting is heat transferred onto said substrate.

15. The decorative tile of claim 5 wherein said clear sheeting is over said barrier coating.

16. The decorative tile of claim 5 wherein said clear sheeting is beneath said coloring agent.

17. The decorative tile of claim 6 wherein said clear sheeting is printed with electrostatic ink.

18. The decorative tile of claim 6 wherein said clear sheeting is heat transferred onto said substrate.

19. The decorative tile of claim 6 wherein said clear sheeting is over said barrier coating.

20. A decorative tile, comprising a polymer substrate having first and second substantially parallel main surfaces, the first main surface having smooth areas interrupted with surface textures, a barrier coating substantially surrounding said substrate, a coloring agent unevenly coating said substrate, said coloring agent being concentrated within said surface textures of said first main surface, and thinly covering said smooth areas of said first main surface, the thickness of the coloring agent being insubstantial compared to the depth of at least some of the surface textures of said substrate, whereby the decorative tile has surface textures substantially reproducing at least some of the surface textures of said substrate.

21. The decorative tile of claim 20 wherein said polymer substrate comprises a hard urethane polymer.

22. The decorative tile of claim 21 wherein said hard urethane polymer substrate comprises a foam.

23. The decorative tile of claim 20 wherein said coloring agent is a water soluble coloring agent.

24. The decorative tile of claim 23 wherein said water soluble coloring agent is an acrylic paint.

25. The decorative tile of claim 23 wherein said water soluble coloring agent is a latex paint.

26. The decorative tile of claim 20 wherein said barrier coating substantially surrounds said substrate beneath said coloring agent.

27. The decorative tile of claim 26 wherein said barrier coating is a high temperature paint.

28. The decorative tile of claim 27 further comprising a clear sheeting printed with ink, on said first main surface of said substrate.

29. The decorative tile of claim 28 wherein said clear sheeting is printed with electrostatic ink.

30. The decorative tile of claim 28 wherein said clear sheeting is heat transferred onto said substrate.

31. The decorative tile of claim 28 wherein said clear sheeting is over said barrier coating.

32. The decorative tile of claim 28 wherein said clear sheeting is beneath said coloring agent.

33. The decorative tile of claim 20 further comprising a clear sheeting printed with ink, on said first main surface of said substrate.

34. The decorative tile of claim 33 wherein said clear sheeting is printed with electrostatic ink.

35. The decorative tile of claim 33 wherein said clear sheeting is heat transferred onto said substrate.

36. The decorative tile of claim 33 wherein said clear sheeting is over said barrier coating.

37. The decorative tile of claim 33 wherein said clear sheeting is beneath said coloring agent.

38. The decorative tile of claim 20 wherein said first and second main surfaces are curved.

* * * * *